United States Patent
Faulkner et al.

[19]

[11] Patent Number: 5,855,466
[45] Date of Patent: Jan. 5, 1999

[54] VEHICLE DISCHARGE SYSTEM

[75] Inventors: Robert Grant Faulkner, Yorkshire; Stephen Carl Henderson, North Yorkshire, both of United Kingdom; Andrew Michael Brown, Colorado, Colo.

[73] Assignee: Harsh Limited, United Kingdom

[21] Appl. No.: 666,517

[22] PCT Filed: Dec. 20, 1994

[86] PCT No.: PCT/GB94/02800

§ 371 Date: Jun. 12, 1996

§ 102(e) Date: Jun. 12, 1996

[87] PCT Pub. No.: WO95/17318

PCT Pub. Date: Jun. 29, 1995

[30] Foreign Application Priority Data

Dec. 21, 1993 [GB] United Kingdom .................... 9326073
Mar. 11, 1994 [GB] United Kingdom .................... 9404768

[51] Int. Cl.[6] ....................................................... B60P 1/40
[52] U.S. Cl. .......................... 414/526; 414/505; 296/50; 298/23 R; 198/666; 222/413
[58] Field of Search .................................. 414/472, 503, 414/505, 523, 526, 528; 298/23 C, 23 MD, 23 R; 296/50; 198/632, 666, 668; 222/164, 413

[56] References Cited

U.S. PATENT DOCUMENTS

| | | |
|---|---|---|
| 2,730,256 | 1/1956 | Louden et al. . |
| 2,876,014 | 3/1959 | Markel .................... 296/50 X |
| 3,056,521 | 10/1962 | Marr ........................ 414/526 X |
| 3,300,068 | 1/1967 | Tarrant, Sr. ................. 414/528 |
| 3,331,519 | 7/1967 | Jennings, Jr. ............ 414/505 X |
| 3,342,355 | 9/1967 | Lasiter ..................... 414/526 X |
| 3,349,970 | 10/1967 | Daneman .............. 222/413 X |
| 3,719,298 | 3/1973 | Brown .................... 414/528 X |
| 3,910,437 | 10/1975 | James . |
| 4,157,150 | 6/1979 | Hetrick .................. 414/526 X |
| 4,261,520 | 4/1981 | Hetrick ................. 222/413 X |
| 4,356,910 | 11/1982 | Togstad . |
| 4,368,003 | 1/1983 | MacDonald .......... 414/526 X |
| 4,405,089 | 9/1983 | Taylor ................... 414/523 X |
| 4,583,905 | 4/1986 | Scherr ................... 414/526 X |
| 4,723,817 | 2/1988 | Wallan ............... 298/23 MD |
| 4,838,598 | 6/1989 | Hyde ......................... 296/50 |
| 4,976,341 | 12/1990 | Lundell ................... 198/666 |
| 4,989,918 | 2/1991 | Biddy ................ 298/23 MD |

FOREIGN PATENT DOCUMENTS

| | | |
|---|---|---|
| 1175378 | 10/1984 | Canada . |
| 1182421 | 2/1985 | Canada . |
| 0017587 | 10/1980 | European Pat. Off. . |
| 0082899 | 7/1983 | European Pat. Off. . |
| 8910379 | 11/1989 | Germany . |
| 64-136841 | 5/1989 | Japan .................... 298/23 R |

*Primary Examiner*—James W. Keenan
*Attorney, Agent, or Firm*—Sughrue, Mion, Zinn, Macpeak & Seas, PLLC

[57] ABSTRACT

A vehicle discharge system for a vehicle (1) provided with a rearwardly tippable bed (2) which includes a tailgate (3) is constituted by a housing (5) mounted at the rear of the bed (2) adjacent to the tailgate (3), a discharge auger (4) rotatably supported within the housing (5) and arranged to receive material which passes the tailgate (3) when the bed is tipped, an auger drive (9) to drive the auger and discharge material carried within the vehicle bed (2) to the side of the vehicle (1) as the bed is tipped and flow control structure (1) capable of differentially exposing material held within the vehicle bed (2) to the discharge auger (4). The flow control structure is constituted by a flow control gate (1) which is capable of being moved in a plane substantially perpendicular to the plane of the base of the vehicle bed (2) and tilted to form a tapered and adjustable opening which exposes material within the vehicle bed to the auger as the bed is tipped. The nature of an auger is to preferentially pick up material from one end remote from that at which material is discharged and so the flow control gate is tilted to expose less of the auger to the material at that end. The combination of varying the opening height and degree of tilt of the flow control gate ensures that material is discharged evenly and controllably across the width of the vehicle bed.

34 Claims, 6 Drawing Sheets

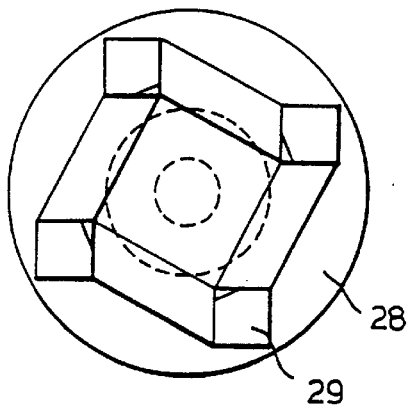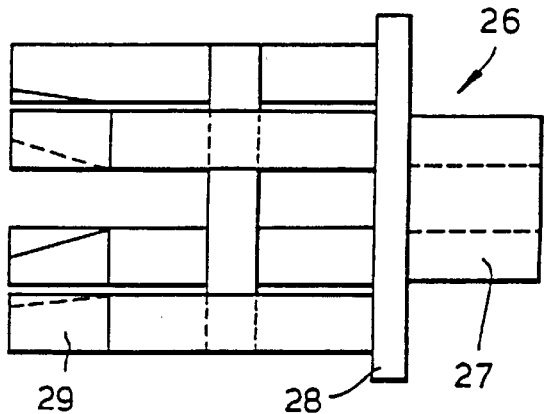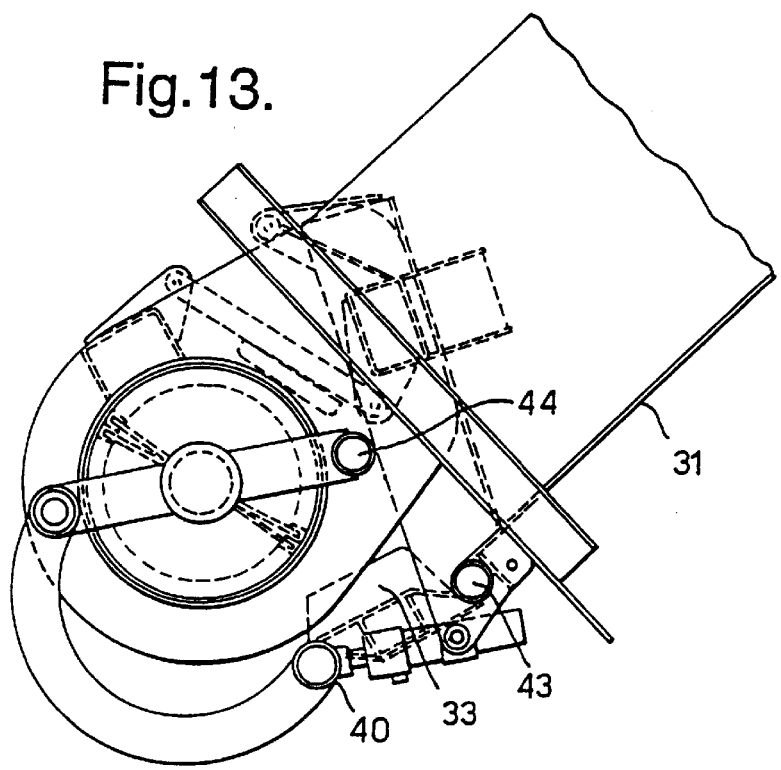

VEHICLE DISCHARGE SYSTEM

TECHNICAL FIELD

The present invention relates to an apparatus designed to be mounted on a vehicle such as a lorry which is provided with a hoist assembly to enable material carried within a bed pivotally connected to the lorry chassis to be tipped.

BACKGROUND ART

Typically, in the building or maintenance of roads, a vehicle containing materials such as sand, gravel, tarmac or road stone is driven to a site and the vehicle bed is tipped either to one side or to the rear to dump the material. The material must then be manually spread evenly over the site as required. Often, when the bed is tipped to the side, the vehicle will become trapped by the tipped material and can only be freed once the work force has cleared the material away from the vehicle's wheels. Whilst it is possible to drive the vehicle forwards while tipping to the rear this operation can be dangerous as the vehicle bed may unload unevenly. This may occur when some of the material freezes overnight and becomes stuck to the bottom of the bed, which in extreme circumstances can cause the vehicle to overturn whilst tipping.

Other systems exist in which one or more conveyors are mounted in the floor of a vehicle bed which allows the material to be discharged whilst the vehicle is driven forward. However, the costs of fitting such a system to a vehicle are prohibitive. Such systems are especially susceptible to mechanical breakdown when larger pieces of material jam the conveyor which can result in the bed unloading unevenly and so adversely affecting the stability of the whole vehicle.

DISCLOSURE OF THE INVENTION

According to the present invention, a vehicle discharge system for a vehicle provided with a rearwardly tippable bed which includes a tailgate comprises a housing mounted at the rear of the bed adjacent to the tailgate, a discharge auger rotatably supported within the housing and arranged to receive material which passes the tailgate when the bed is tipped, auger drive means to drive the auger and discharge material carried within the vehicle bed to the side of the vehicle as the bed is tipped and flow control means capable of differentially exposing material held within the vehicle bed to the discharge auger.

Preferably, the housing and the auger extend across substantially the entire length of the vehicle tailgate.

Preferably, the flow control means comprises a flow control gate which is capable of being moved in a plane substantially perpendicular to the plane of the base of the vehicle bed and tilted to form a tapered and adjustable opening which exposes material within the vehicle bed to the auger as the bed is tipped. The nature of an auger is to preferentially pick up material from one end remote from that at which material is discharged and so the flow control gate is tilted to expose less of the auger to the material at that end. The combination of varying the opening height and degree of tilt of the flow control gate ensures material is discharged evenly and controllably across the width of the vehicle bed.

Preferably, the auger drive means comprises a hydraulic motor which is arranged to rotate the discharge auger upwardly into the material.

Preferably, an end bearing assembly is connected to the discharge auger at each end to rotatably support the auger within the housing.

Preferably, the discharge system further comprises an extension auger which, in use, is co-axially keyed to the discharge auger so that the two augers can rotate in unison and is arranged to extend the distance to which material is discharged to the side of the vehicle.

The discharge system is preferably provided with means to break up compacted material before it enters the discharge auger. Preferably, this means comprises an agitator which is fixed adjacent to the adjustable opening within the vehicle bed to break up compacted material and additionally form a safety grid to prevent any person working inside the vehicle bed from contacting the auger. Alternatively, or additionally, the means comprises a vehicle bed vibrator.

In a first preferred example, the flow control gate forms at least part of the tailgate. Preferably, a hydraulic ram is provided on the centre line of the tailgate to raise and lower the flow control gate. Preferably, the sides of the tailgate are provided with locking pin receiving holes which receive a tilt locking pin to independently restrict the height to which one end of the control gate can be lifted above the base of the vehicle bed so that operation of the hydraulic ram controls the degree of tilt across the flow control gate.

Preferably, each end bearing assembly comprises a hinged door which can be opened to allow the auger drive means to be connected to the discharge auger or closed to resist reaction forces at the end of the auger.

In use, the auger drive means may be directly or indirectly connected to one end of the discharge auger with the adjacent end bearing assembly door opened to allow material carried by the auger to be discharged to the side of the vehicle. The opposite end bearing assembly door is closed to resist reaction forces.

In this first example, preferably, a correspondingly shaped extension auger supported within an extension housing is hinged at one end of the discharge auger housing. The extension auger may be selectively connected to the discharge auger at that end so that the two augers are co-axially aligned by opening the adjacent end bearing assembly door and connecting the two augers together. The auger drive means is arranged to drive the extension auger and transport material in a direction towards the extension auger. Preferably, the extension housing includes an outlet through which material carried by the extension auger is discharged. The length of the extension auger is selected according to the distance at which material is required to be discharged to the side of the vehicle.

Preferably, the end of the extension auger which connects to the discharge auger includes flight engaging means adapted to engage the exposed flights of the discharge auger. Preferably, the extension auger comprises a core pipe adapted to receive an extension of a core pipe of the discharge auger to co-axially align the two augers. This feature helps the operator connect the two augers together.

Preferably, the discharge system is provided with two such extension augers, hinged at opposite ends of the discharge auger housing.

Preferably, a single hydraulic motor supported on a releasable motor drive assembly is provided which may be selectively connected to either extension auger. In use, only one extension auger is connected to the discharge auger at any moment in time with the adjacent end bearing assembly door open, the opposite end bearing assembly door closed and the other extension auger being secured to the rear of the discharge auger housing. To change the side to which material is discharged, the extension auger in use is disconnected from the end of the discharge auger and the associated end bearing assembly door closed. The releasable motor drive assembly is then simply disconnected from the one extension auger and subsequently reconnected to the end of the other extension auger, which is in turn connected to the discharge auger by opening the adjacent end bearing assembly door and connecting the two augers together.

In a second preferred example, the flow control gate comprises a plate positioned adjacent an opening in the discharge auger housing through which material enters the discharge auger. Preferably, the discharge auger housing is pivotally connected to the tailgate so that as the tailgate is opened or closed, the position of the flow control gate relative to the bottom of the vehicle bed is varied to control the flow of material as it passes into the discharge auger. Preferably, tilt control means are provided to control the height and degree of tilt of the flow control gate. Suitable tilt control means include hydraulic rams and rack and pinion mechanisms provided at opposite ends of the flow control gate.

The tailgate preferably comprises a pivotable gate portion which defines an adjustable opening and which includes a first pivotal connection adjacent to the base of the vehicle bed and a second pivotal connection to the discharge auger housing. The discharge auger housing is also pivotally connected to the tailgate via a third pivotal connection. The pivotable gate portion is arranged to be hydraulically driven around the first pivotal connection to lower or raise the pivotable gate and hence vary the position of the discharge auger and flow control gate relative to the bottom of the vehicle bed to a controllable extent. The pivotable gate portion of the tailgate additionally forms the surface over which material passes into the discharge auger as the vehicle bed is tipped. Preferably, one or more hydraulic rams are provided to pivot the pivotable gate.

Preferably, covers are provided to constrain the flow of material passing over the pivotable gate to ensure all the material flows onto the discharge auger as the vehicle bed is tipped.

Depending upon the depth of the vehicle bed the whole tailgate section may form the pivotable gate. Only a lower section may form the pivotable gate if the bed is deep.

In this second preferred example, the extension auger comprises a correspondingly shaped and co-axial auger supported within an extension housing capable of sliding relative to the discharge auger and housing. Preferably, the extension auger and housing is arranged to slide on an extension tube which is supported within a support tube forming an integral part of the pivotable gate.

In a normally retracted position, preferably, the discharge auger and extension auger are twisted together to form a single compact auger in which the flights of the augers are in alignment. The extension auger and housing is normally retracted and locked within the core of the discharge auger housing for storage or transport purposes. Preferably, the extension housing extends beyond the flights of the extension auger to prevent any person from contacting the extension auger.

Preferably, to extend the extension auger, an exposed end of the extension auger is clamped to prevent rotation and the extension housing is released so that the extension tube is free to slide out of the support tube. Subsequent rotation of the discharge auger produces a reaction between the flights of the two augers which drives the extension auger and housing outwardly. The travel of the extension tube is preferably limited to ensure the flights of the two augers always remain at least partially overlapping one another to transmit a drive force. Once the extension auger is extended it is then released so that it is free to rotate with the discharge auger.

To retract the extension auger and housing, the extension auger is reclamped to prevent rotation and the direction of rotation of the discharge auger is reversed so that the resultant torque produces a force which screws the two augers back together until they are re-aligned within the discharge auger housing.

Preferably, at least a portion of the edges of the flights in both the discharge auger and extension auger are provided with a friction reducing material which acts as a bearing surface. Preferably, the friction reducing material is provided over a region of up to 360° of twist at the overlapping ends of the two augers. Preferably, the friction reducing material comprises ACM (Registered Trade Mark).

As an alternative to an integral extension auger, the system of the second example may be provided with a releasable extension sleeve which connects to the discharge auger housing and allows material to be discharged a short distance to the side of the vehicle. In this case, preferably, the end bearing assembly at the discharge side of the discharge auger comprises a core bearing which includes a number of struts which support a collar surrounding a core pipe of the discharge auger and material is free to pass between the struts out into the extension sleeve. The extension sleeve would typically be at least 850 mm in length to prevent any person from contacting the auger.

Preferably, material may be discharged to the rear of the vehicle by disconnecting the discharge auger housing at the second pivotal connection so that as the pivotable gate is lowered and the bed is tipped, the discharge auger remains clear of material passing rearwardly over the pivotable gate.

In the discharge system of the present invention, it is preferred that a remote controller is provided to vary the speed of the auger and the angle to which the vehicle bed is tipped. The remote controller may also control the position of the pivotable gate of the second example by controlling the one or more hydraulic rams. In particular, the pivotable gate can be made to vibrate to help break up material as it passes through the flow control gate. An operator may follow the vehicle from a safe distance as it discharges and observe the flow of material or the entire discharge system can be operated from within the drivers cab.

Load cells may be located in the vehicle bed, chassis and hoist assembly to provide information which may be used to operate the tilt control means automatically to vary the height and degree of tilt of the flow control gate.

The discharge system in accordance with the present invention provides an auger and drive system which can simply be fitted to any new or existing vehicle, and conversely, can be removed when the vehicle is required for a different purpose. The system is extremely flexible and is efficient and safe. It is also simple to operate and requires very little maintenance. The ability to control the discharge of material over a site meets a demand which has been outstanding in the industry for some time.

BRIEF DESCRIPTION OF DRAWINGS

Examples of the present invention will now be described in detail with reference to the accompanying drawings, in which:

FIGS. 8A and 8B show a releasable motor drive assembly support for direct connection to the extension auger of FIG. 4;

FIG. 13 shows a side view of the second example of a discharge system in which material is discharged to the rear of the vehicle; and, FIG. 14 shows a partial cross-sectional view of a vehicle bed.

BEST MODES FOR CARRYING OUT THE INVENTION

Figure 1:
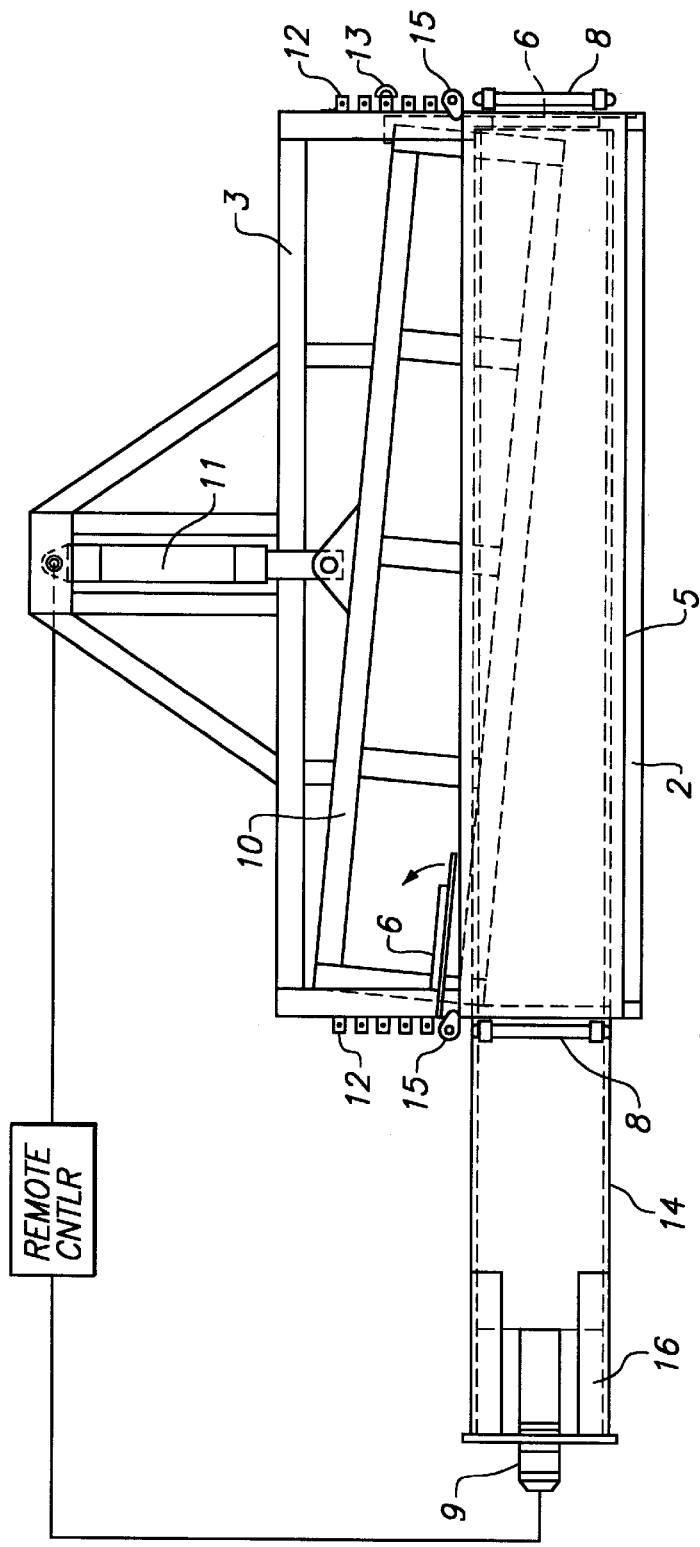
FIGS. 1 and 2 show a first example of a discharge system in accordance with the present invention fixed to the rear of a vehicle.
Figure 2:
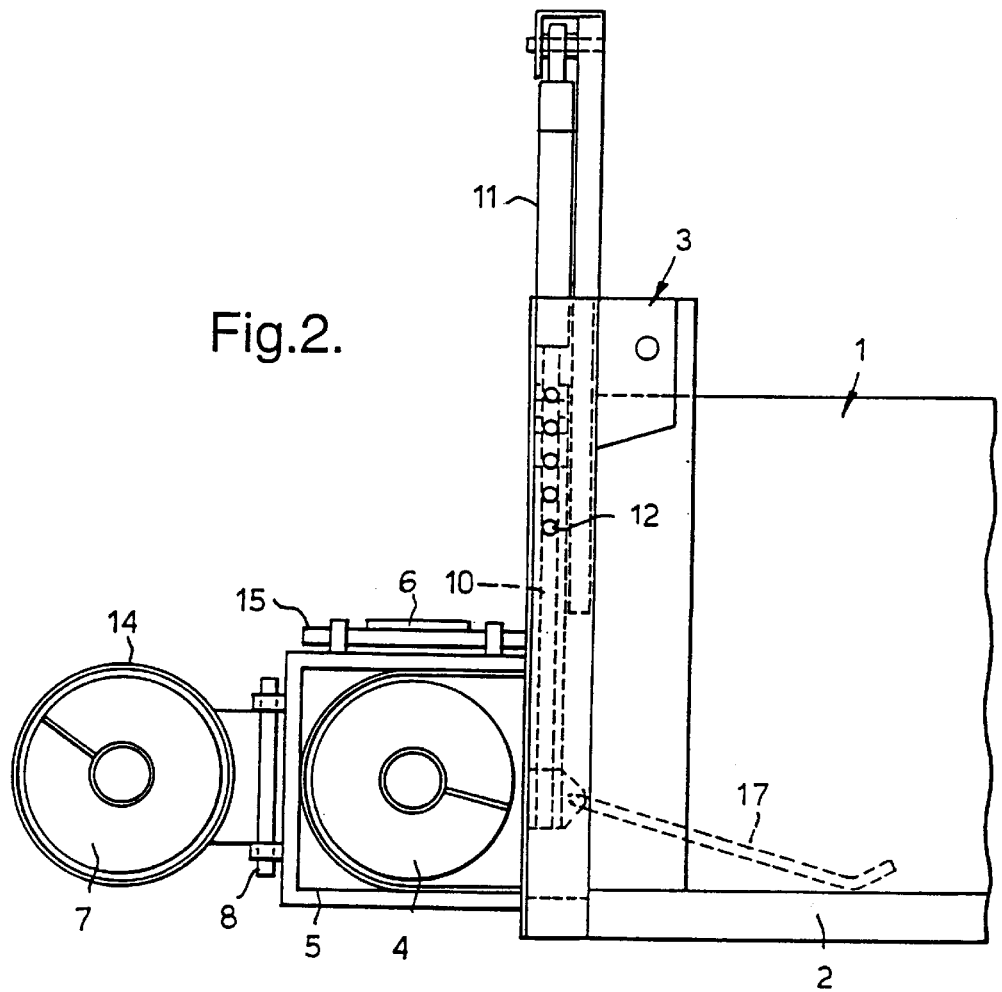

FIGS. 1 and 2 illustrate a first example of a vehicle discharge system in accordance with the present invention.

A vehicle 1, for example a lorry, comprising a tippable bed 2 pivotally connected to the lorry chassis (not shown) is provided with a vehicle discharge system mounted at the rear of the vehicle adjacent the tailgate 3 for discharging material contained within the vehicle bed 2 when the vehicle bed is tipped rearwardly.

The discharge system comprises a discharge auger 4 supported within a housing 5 by end bearing assemblies 6, two extension augers 7 mounted on vertical hinges 8 at opposite ends of the housing 5 (only one extension auger is shown fitted in FIG. 1 for clarity) and drive means 9 releasably connected to one of the extensions auger 7. The drive means 9 comprises a hydraulic motor which rotates the extension auger 7 directly which in turn drives the discharge auger 4.

The discharge auger housing 5 is mounted at the rear of the lorry adjacent to the tailgate 3 at the base of the vehicle 2 and adjacent to an opening in the tailgate 3. The size of the opening is controlled by a flow control gate 10 which extends across the length of the tailgate 3. The flow control gate 10 is pivotally connected to a central hydraulic ram 11 to raise or lower the flow control gate. The sides of the tailgate 3 include locking pin receiving holes 12 which are adapted to receive a tilt locking pin 13. The location of the tilt locking pin 13 on one side only of the tailgate 3 determines the height to which that end of the flow control gate 10 can be raised. Operation of the hydraulic ram 11 introduces a degree of slant across the length of the flow control gate 10 to vary the exposure of the discharge auger 4 to material held within the vehicle bed 2 across the length of the discharge auger 4 to take account of the tendency of the discharge auger to preferentially pick up material at the opposite end to which material is discharged. The combination of varying the opening height and degree of tilt of the flow control gate ensures material is discharged evenly and controllably across the width of the vehicle bed.

As will be described in detail below, the drive means 9 can be connected to drive either of the extension augers 7 by simply unclipping the releasable motor drive assembly (see FIGS. 8A and 8B) from one end of the extension auger housing 14 and re-connecting it to the opposite extension auger.

In the example, the drive means 9 is a high torque, low speed hydraulic motor and is arranged to rotate the extension auger 7 which in turn drives the discharge auger 4. Material picked up by the discharge auger 4 as the vehicle 1 is tipped rearwardly is carried towards the end of the extension auger 7 where the motor 9 is connected. Material flows through an open door 15 of the end bearing assembly 6 and is discharged to the side of the vehicle bed through an opening 16 in the extension auger housing 14.

The discharge system may further comprise an agitator 17 pivotally connected and moved by the control gate 10 which breaks up compacted or lumpy loads before entering the discharge auger 4 and provides a safety shield for any person working inside the vehicle bed.

FIG. 2 illustrates how the opposite extension auger is stowed away to the rear of the discharge auger housing whilst it is not connected to the discharge auger. The end bearing assembly door 15 is open in this view.

Figure 3:
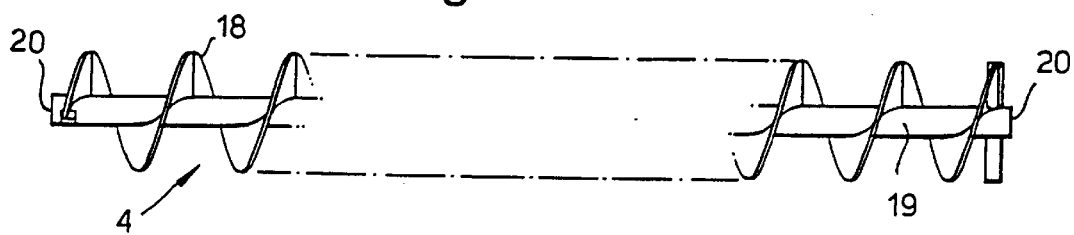
FIG. 3 shows a discharge auger suitable for use in the example shown in FIGS. 1 and 2.

FIG. 3 shows a detailed view of the discharge auger 4. The discharge auger comprises helical flights 18 supported on a core pipe 19. Core pipe 19 is hollow so that it may be heated with a gas heater (not shown) to prevent tarmac setting on the components of the discharge system as it is discharged. Each end of the discharge auger core pipe 19 extends to form a core stub 20 which, in use, locates either in the end bearing assembly 6 when the end bearing assembly door 15 is closed or, as will be described in detail below, within a frusto-conical guide section of the core pipe of the extension auger 7, when fitted.

FIGS. 4 to 7 show an example of an extension auger 7. The extension auger 7 comprises a hollow core pipe 21 which supports helical auger flights 22, the dimensions of which, in this example, correspond to those of the helical flights 18 of the discharge auger 4. It is possible to provide an extension auger with flights having a greater pitch than that of the discharge auger to increase the flow of material within the extension housing.

Figure 7A:
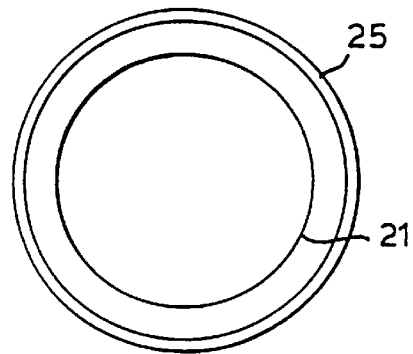
FIGS. 7A and 7B are detailed views of a guide cone formed in the end of the extension auger illustrated in FIG. 5.
Figure 7B:
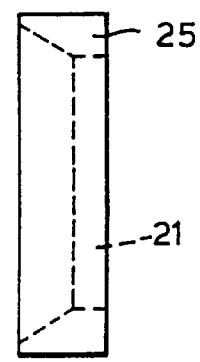

A locating key arrangement 23 is provided at one end of the extension auger 7 to receive a motor drive assembly, shown in detail in FIGS. 8A and 8B. The other end of the extension auger 7 comprises a flight brace arrangement 24 which receives an end portion of the flights 18 of the discharge auger 4 when the extension auger 7 is connected. The end of the core pipe 21 comprises a frusto-conical guide section 25, as best illustrated in FIGS. 7A and 7B, which receives and supports the core stub 20 of the discharge auger 4.

Figure 4:
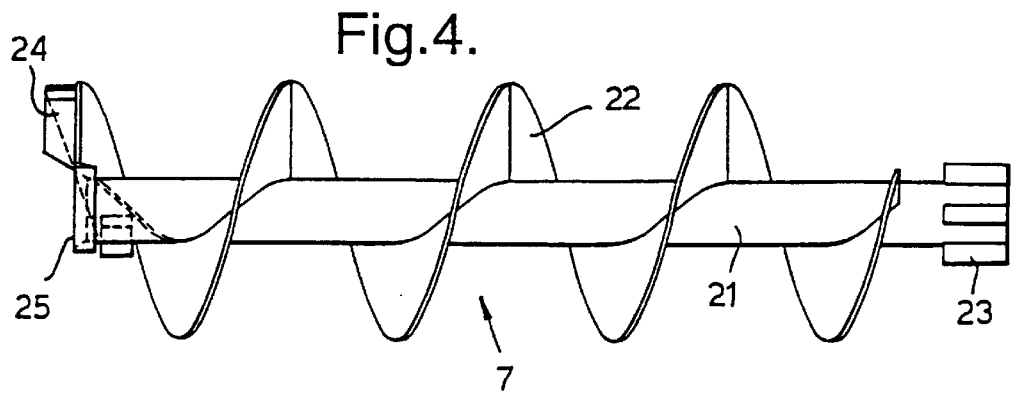
FIG. 4 shows an extension auger.
Figure 5:
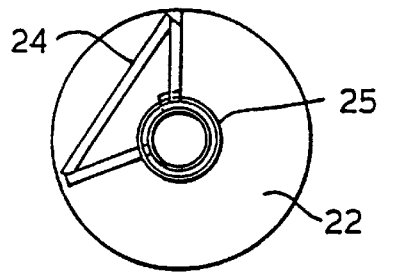
FIG. 5 shows an end view of the extension auger illustrated in FIG. 4.
Figure 6:
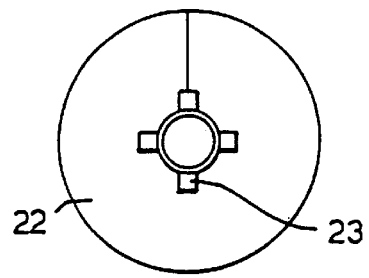
FIG. 6 shows an opposite end view of the extension auger illustrated in FIG. 4.

The releasable motor drive assembly support 26 shown in FIGS. 8A and 8B comprises a hub 27 and back plate 28 which receive and support a hydraulic motor (not shown) and four complementary keys 29. In use, the complimentary keys 29 co-operate with the locating key arrangement 23 shown in FIG. 4, provided on the end of the extension auger 7.

In use, only one extension auger 7 is connected to the discharge auger 4 at any moment in time with the adjacent end bearing assembly door 15 open, the opposite end bearing assembly door 15 closed and the other extension auger 7 being secured to the rear of the discharge auger housing 5. To change the side to which material is discharged, the extension auger in use is disconnected from the end of the discharge auger 4 and the associated end bearing assembly door 15 closed. The hydraulic 9 motor is then simply disconnected from the one extension auger and subsequently reconnected to the other extension auger, which is in turn connected to the discharge auger by opening the adjacent end bearing assembly door and connecting the two augers together.

FIGS. 9 to 13 illustrate a second example of a discharge system in accordance with the present invention.

A vehicle, for example a lorry, comprising a tippable bed 31 pivotally connected to the lorry chassis (not shown) is provided with a vehicle discharge system mounted at the rear of the vehicle adjacent the tailgate 32 for discharging material contained within the vehicle when the vehicle bed 31 is tipped rearwardly.

The tailgate 32 comprises a lower pivotable tailgate section 33 which may be opened or closed relative to the upper portion of the tailgate by two hydraulic rams 34. The discharge system comprises a discharge auger 35 supported within a housing 36, and extension auger 37 supported within an extension housing 38 which is mounted on an extension tube 39 which lies within a support tube 40 forming part of the pivotable tailgate 33. The extension auger 37 is frictionally keyed to the discharge auger 35 and the two augers are supported on friction bearings 41 formed from a material known as ACM (registered trade mark) so they are capable of rotating and sliding relative to one another within the two housings. Bearing pads made of the same material (not shown) are placed between the two housings so that the two housings can slide relative to one another. A hydraulic motor 42 is arranged to drive the discharge auger 35 to discharge material held within the vehicle bed.

One end of the discharge auger 35 remote from the extension auger 37 is provided with an end bearing assembly which supports the core pipe of the discharge auger 35 and resists reaction forces created when the augers are rotated.

Figure 11:
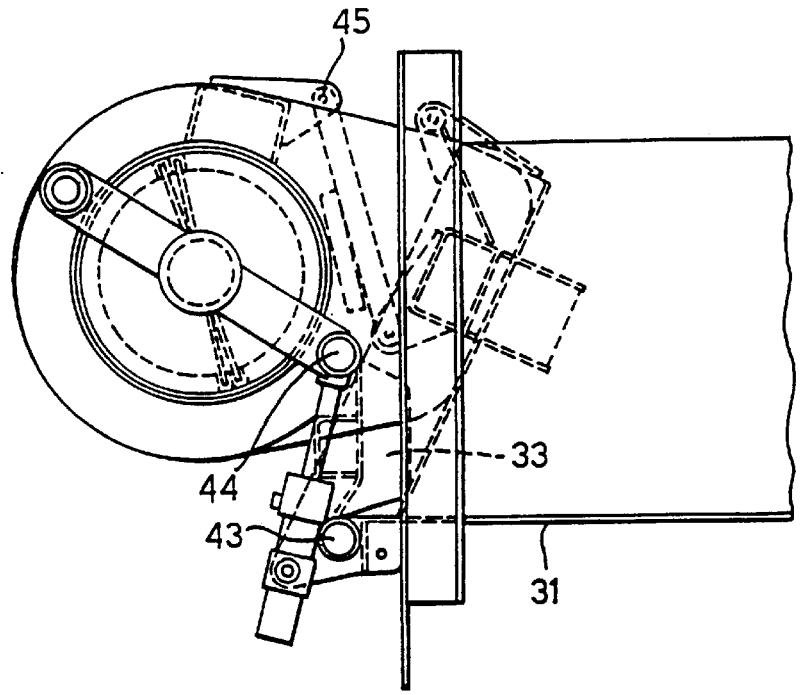
FIG. 11 shows a side view of the second example of a discharge system with the discharge system in a stowed condition and the extension auger retracted.

Referring to FIG. 11, the pivotable tailgate 33 is pivotally connected to the rear of the vehicle bed at a first pivotal connection 43 and also to the discharge auger housing at a second pivotal connection 44 at the end of the support tube 40. The discharge auger housing 36 is also pivotally connected to the tailgate via a third pivotal connection 45. In use, the pivotable tailgate 33 is hydraulically driven around the first pivotal connection 43 to raise or lower the pivotable tailgate 33 and hence vary the position of the discharge auger 36 relative to the bottom of the vehicle bed to a controllable extent.

A flow control gate 46 is provided adjacent an opening slot 47 formed in the discharge auger housing 36 through which material enters the discharge auger 35. Opposite ends of the flow control gate are provided with a motorised rack and pinion mechanism (not shown) to independently adjust the height at each end of the flow control gate 46 to vary the exposure of the discharge auger to material held within the vehicle bed across the length of the auger 35. The nature of an auger is to preferentially pick up material from one end and so the flow control gate 46 is tilted to expose less of the discharge auger 35 to the material at that end. The combination of varying the opening height and degree of tilt of the flow control gate 46 ensures the material is discharged evenly and controllably across the width of the vehicle bed.

Side covers 47 are provided to constrain the flow of material passing over the pivotable tailgate 33 to ensure material flows onto the discharge auger 35 as the vehicle bed is tipped.

Figure 9:
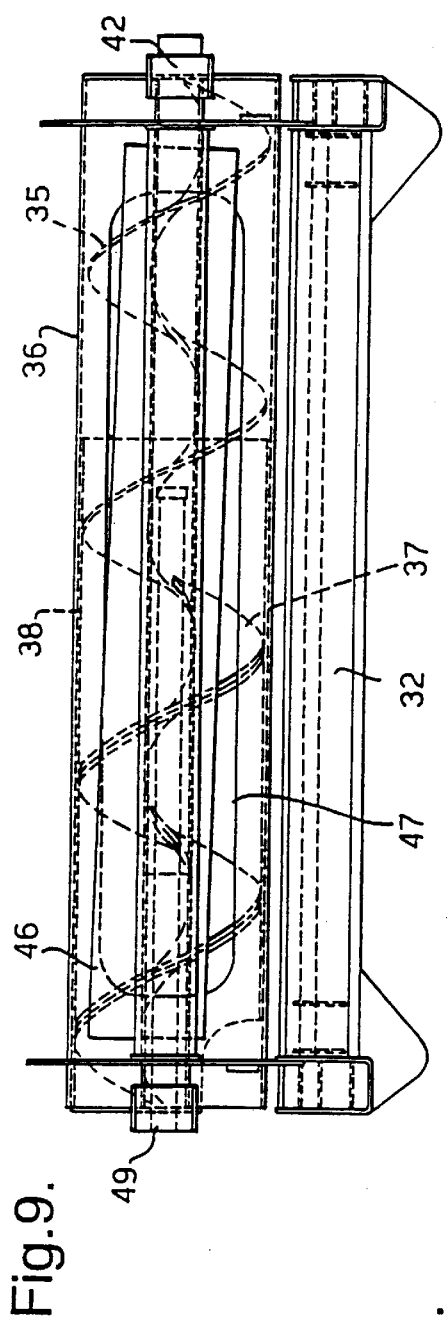
FIG. 9 shows a plan view of a second example of a discharge system fitted to the rear of a vehicle with an extension auger in a retracted position.

FIG. 9 shows the discharge system in a normally retracted position in which the extension auger 37 and housing 38 are retracted and locked within the discharge auger housing so that the flights of the two augers are aligned.

Figure 10:
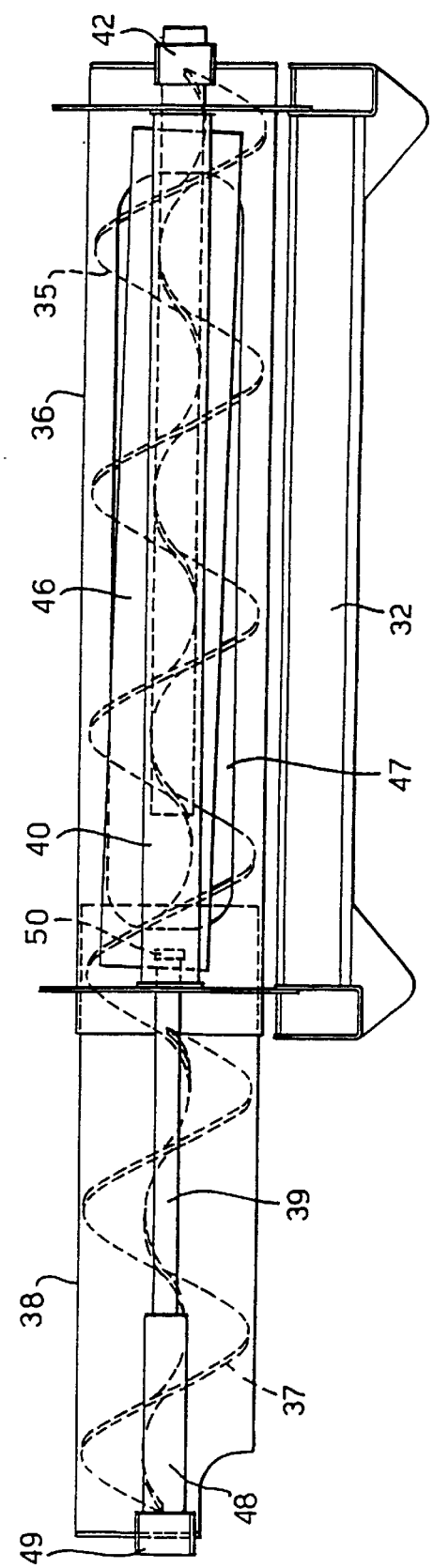
FIG. 10 shows another plan view of the discharge system of FIG. 9 with the extension auger in an extended position.

FIG. 10 shows the extension auger 37 in the extended position. To extend the extension auger 37, an exposed end 48 of the extension auger is clamped at the core bearing 49 to prevent rotation and the extension housing 38 is released so that it is free to slide along the extension tube 39 within the support tube 40. Subsequent rotation of the discharge auger 35 by the hydraulic motor 42 produces a reaction between the flights of the two augers and drives the extension auger 37 and associated housing 38 outwardly. The travel of the extension housing 38 is limited by a stop member 50 to ensure that the flights of the two augers always remain at least partially overlapping one another to transmit a drive force.

With the extension auger 37 extended to the required position, the extension auger is released so that it is free to rotate with the discharge auger 35. To retract the extension auger 37 and its housing 38, the extension auger 37 is re-clamped to prevent rotation. The direction of rotation of the discharge auger 35 is reversed so that the resultant torque produces a force which screws the two augers back together until they are aligned.

FIG. 11 shows how the discharge system is stowed in transit with the discharge system being held well clear of the base of the rear of the vehicle to allow access for towing vehicles and other machinery.

Figure 12:
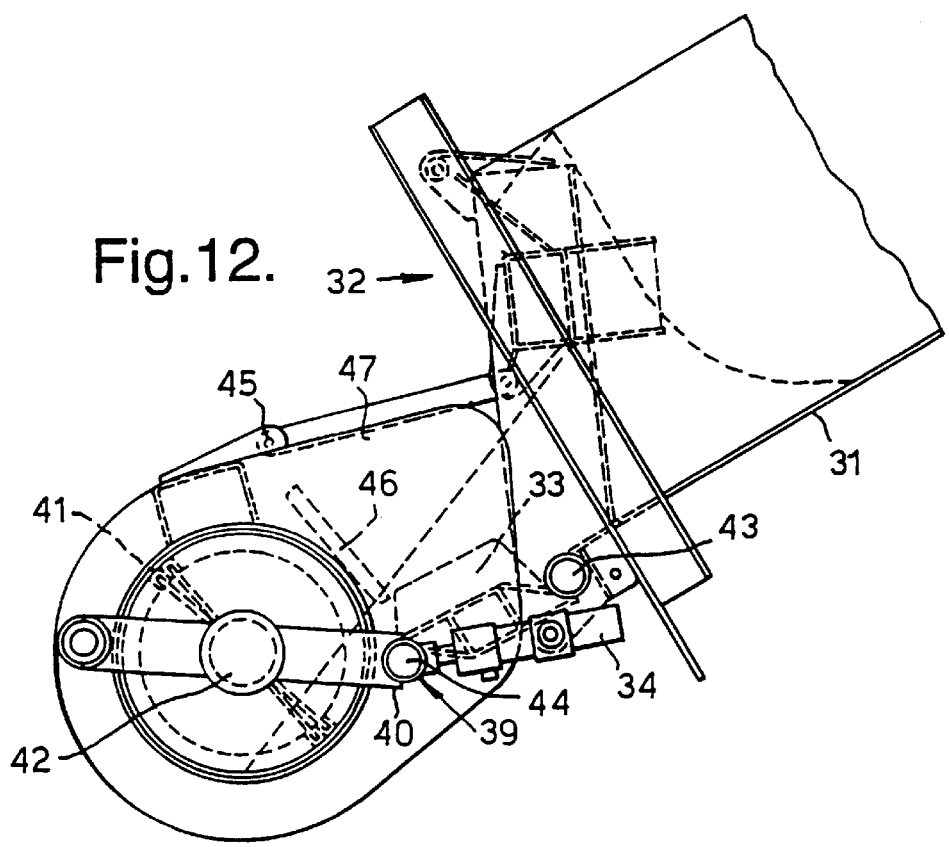
FIG. 12 shows a side view of the second example of a discharge system discharging material with the vehicle bed tipped and material being discharged.

FIG. 12 shows material being discharged when the vehicle is tipped rearwardly. Material passes over the pivotable tailgate 33 and through the adjustable opening defined by the surface of the pivotable tailgate 33 and the lower edge of the flow control gate 46 into the discharge auger 35. The pivotable tailgate 33 is arranged to be hydraulically driven around the first pivotal connection 43 to lower or raise the pivotable tailgate and hence vary the position of the discharge auger 35 and flow control gate 46 relative to the bottom of the vehicle bed to a controllable extent. The pivotable tailgate additionally forms the surface over which material passes into the discharge auger 35 as the vehicle bed is tipped.

FIG. 13 shows the discharge system being used in a rear discharge mode, whereby the auger housing 36 is disconnected from the second pivotal connection 44 and the third pivotable connection 45 is locked so that raising or lowering the tailgate 33 has no effect on the position of the discharge auger. As the vehicle bed is tipped rearwardly, material is therefore free to pass over the tailgate 33 and discharge to the rear of the vehicle.

Figure 14:
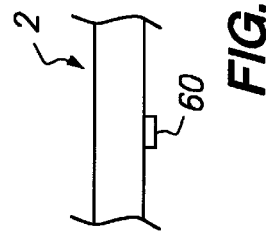

As shown representatively in FIG. 14, which is a partial cross-sectional view of vehicle bed 2, load cells 60 may be located in the vehicle bed 2, chassis, and hoist assembly to provide information which may be used to operate the tilt control means automatically to vary the height and degree of tilt of the flow control gate. The particular type, location, and number of load cells is not critical to the invention, so long as the load cells provide the requisite information to the tilt control means.

We claim:

1. A material discharge system for a vehicle (1) provided with a rearwardly tippable bed (2) and a tailgate (3; 32) under which material in the load bed passes when the bed is tipped, comprising a housing (5, 36) mounted at the rear of the bed (2) adjacent to the tailgate (3; 32), a discharge auger (4; 35) rotatably supported within the housing (5; 36), auger drive means (9; 42) to drive the auger and discharge material carried within the vehicle bed (2) to the side of the vehicle (1) as the bed (2) is tipped and a flow control gate (10; 46) which is capable of being moved in a plane substantially perpendicular to the plane of the base of the vehicle bed (2) and tilted to form a tapered and adjustable opening which differentially exposes material held within the vehicle bed (2) to the discharge auger (4; 35) along a length of the discharge auger (4; 35) as the bed (2) is tipped, wherein the flow control gate and the discharge auger (4) extend across substantially the entire width of the tippable bed (2), such that, by adjusting the opening provided beneath the flow control gate, access to the discharge auger (4) can be controlled to ensure that the material is discharged uniformly across the entire width of the bed (2).

2. A discharge system according to claim 1, in which the housing (5; 36) and the discharge auger (4; 35) extend across substantially the entire length of the vehicle tailgate (3; 32).

3. A discharge system according to claim 1, in which an end bearing assembly (6; 49) is connected to the discharge auger (4; 35) at each end to rotatably support the auger within the housing.

4. A discharge system according to claim 1, further comprising an extension auger (7; 37) which, in use, is co-axially keyed to the discharge auger (4; 35) so that the two augers can rotate in unison and is arranged to extend the distance to which material is discharged to the side of the vehicle.

5. A discharge system according to claim 1, in which, the auger drive means (9; 42) comprises a hydraulic motor which is arranged to rotate the discharge auger (4; 35) so that flights (18) of the discharge auger move in a direction upwardly into the material.

6. A discharge system according to claim 1, further comprising means to break up compacted material before it enters the discharge auger.

7. A discharge system according to claim 1, in which the flow control gate (10) forms at least part of the tailgate (3).

8. A discharge system according to claim 7, in which a hydraulic ram (11) is provided on the centre line of the tailgate (3) to raise and lower the flow control gate (10).

9. A discharge system according to claim 7, in which the sides of the tailgate (3) are provided with locking pin receiving holes (12) which receive a locking pin (13) to independently restrict the height to which either end of the control gate (10) can be lifted above the base of the vehicle bed (2).

10. A discharge system according to claim 3, in which each end bearing assembly (6) comprises a hinged door (15) which can be opened to allow the auger drive means (9) to be directly or indirectly connected to the discharge auger (4) or closed to resist reaction forces at the end of the auger (4).

11. A discharge system according to claim 1, in which a first extension auger (7) supported within an extension housing (14) is hinged at one end of the discharge auger housing (5) and may be selectively connected to the discharge auger (4) at that end so that the two augers are co-axially aligned, wherein the first extension auger (7) cooperates with the discharge auger (4) to facilitate transport of the material.

12. A discharge system according to claim 11, in which the auger drive means (9) is arranged to drive the extension auger (7) and transport material in a direction towards the extension auger (7) where it is picked up by the extension auger and then discharged through an outlet (16) in the extension housing (14).

13. A discharge system according to claim 11, in which an end of the extension auger (7) which, in use, connects to the discharge auger (4), includes flight engaging means (24) adapted to engage exposed flights (18) of the discharge auger (4).

14. A discharge system according to claim 11, in which the extension auger (7) comprises a core pipe (21, 25) adapted to receive an extension (20) of a core pipe (19) of the discharge auger (4) to co-axially align the two augers.

15. A discharge system according to claim 11, further comprising a second extension auger (7), hinged at an end of the discharge auger housing opposite the end to which the first extension auger (7) is hinged.

16. A discharge system according to claim 15, in which the auger drive means (9) comprises a single hydraulic motor supported on a releasable motor drive assembly (26) which may be selectively connected to an extension auger or to the discharge auger.

17. A discharge system according to claim 1, in which the flow control gate comprises a plate (46) positioned adjacent an opening (47) in the discharge auger housing (36) through which material enters the discharge auger (35) and the discharge auger housing (36) is pivotally connected to the tailgate (32) so that as the tailgate (32) is opened or closed, the position of the discharge auger (35) and flow control gate (46) relative to the bottom of the vehicle bed (2) is varied to control the flow of material as it passes into the discharge auger (35).

18. A discharge system according to claim 17, in which tilt control means are provided to control the height and degree of tilt of the flow control gate (46).

19. A discharge system according to claim 8, in which load cells are locatable in the vehicle bed (2), chassis and hoist assembly to provide information which may be used to operate the tilt control means automatically to vary the height and degree of tilt of the flow control gate (46).

20. A discharge system according to claim 17, in which the tailgate (32) comprises a pivotable gate portion (33) which defines an adjustable opening and which includes a first pivotal connection (43) adjacent the base of the vehicle bed (2) and a second pivotal connection (44) to the discharge auger housing (36) and the discharge auger housing (36) is also pivotally connected to the tailgate (32) via a third pivotal connection (45).

21. A discharge system according to claim 20, in which the pivotable gate portion (33) is arranged to be hydraulically driven around the first pivotal connection (43) to lower or raise the pivotable gate (33) and hence vary the position of the discharge auger (35) and flow control gate (46) relative to the bottom of the vehicle bed to a controllable extent.

22. A discharge system according to claim 20, in which one or more hydraulic rams (34) are provided to pivot the pivotable gate (33).

23. A discharge system according to claim 20, in which covers (47) are provided to constrain the flow of material passing over the pivotable gate (33) to ensure all the material flows onto the discharge auger (35) as the vehicle bed is tipped.

24. A discharge system according to claim 20, further comprising an extension auger (37) comprising a correspondingly shaped and co-axial auger supported within an extension housing (38) capable of sliding relative to the discharge auger (35) and housing (36) so that in a normally retracted position, the discharge auger (35) and extension auger (37) are twisted together to form a single compact auger.

25. A discharge system according to claim 24, in which the extension auger (37) and housing (38) is arranged to slide on an extension tube (39) which is supported within a support tube (40) forming an integral part of the pivotable gate (33).

26. A discharge system according to claim 25, in which the extension auger (37) may be extended by clamping an exposed end of the extension auger (37) to prevent rotation and the extension housing (38) may be released so that the extension tube (39) is free to slide out of the support tube (40) so that subsequent rotation of the discharge auger (35) produces a reaction between the flights of the two augers which drives the extension auger (37) and housing (38) outwardly.

27. A discharge system according to claim 26, in which the travel of the extension tube (39) is limited by a stop tube (50) to ensure the flights of the two augers always remain at least partially overlapping one another to transmit a drive force.

28. A discharge system according to claim 20, in which at least a portion of the edges of the flights in both the discharge auger (35) and extension auger (37) are provided with a friction reducing material (41) which acts as a bearing surface.

29. A discharge system according to claim 28, in which the friction reducing material (41) is provided over a region of up to 360° of twist at the overlapping ends of the two augers.

30. A discharge system according to claim 28, in which, the friction reducing material (41) comprises ACM (Registered Trade Mark).

31. A discharge system according to claim 20, in which material may be discharged to the rear of the vehicle by disconnecting the discharge auger housing (36) at the second pivotal connection (44) so that as the pivotable gate (33) is lowered and the bed is tipped, the discharge auger (35) remains clear of material passing rearwardly over the pivotable gate (33).

32. A discharge system according to claim 17, further comprising a hollow releasable extension sleeve which connects to the discharge auger housing and allows material to be discharged a short distance to the side of the vehicle.

33. A discharge system according to claim 32, in which an end bearing assembly at the discharge side of the discharge auger (35) comprises a core bearing which includes a number of struts which support a collar surrounding a core pipe of the discharge auger and material is free to pass between the struts out into the extension sleeve.

34. A discharge system according to claim 1, in which a remote controller is provided to vary the speed of the auger (4; 35) and the angle to which the vehicle bed (2) is tipped.

* * * * *